United States Patent
Subramanian et al.

(10) Patent No.: US 10,007,515 B2
(45) Date of Patent: Jun. 26, 2018

(54) SYSTEM AND METHOD FOR AUTOMATIC PORTING OF SOFTWARE APPLICATIONS INTO A CLOUD COMPUTING ENVIRONMENT

(71) Applicant: ORACLE INTERNATIONAL CORPORATION, Redwood Shores, CA (US)

(72) Inventors: Velmurugan Subramanian, Belmont, CA (US); Nilesh Junnarkar, Palo Alto, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days. days.

(21) Appl. No.: 15/200,994

(22) Filed: Jul. 1, 2016

(65) Prior Publication Data

US 2017/0003960 A1 Jan. 5, 2017

Related U.S. Application Data

(60) Provisional application No. 62/188,280, filed on Jul. 2, 2015.

(51) Int. Cl.
*G06F 9/45* (2006.01)
*G06F 8/76* (2018.01)
(Continued)

(52) U.S. Cl.
CPC ............... *G06F 8/76* (2013.01); *G06F 8/41* (2013.01); *G06F 8/60* (2013.01)

(58) Field of Classification Search
CPC ....................................................... G06F 8/76
(Continued)

(56) References Cited

U.S. PATENT DOCUMENTS 7,263,686 B2 * 8/2007 Sadiq ................. G06F 9/44505
709/203
7,316,003 B1 * 1/2008 Dulepet ................ G06F 17/218
717/110

(Continued)

OTHER PUBLICATIONS

Zoghi et al, "Designing Adaptive Applications Deployed on Cloud Environments", ACM Transactions on Autonomous and Adaptive Systems, vol. 10, No. 4, Article 25, pp. 1-26, 2016.*

(Continued)

*Primary Examiner* — Anil Khatri
(74) *Attorney, Agent, or Firm* — Tucker Ellis LLP

(57) ABSTRACT

In accordance with an embodiment, described herein is a system and method for automatic porting of software applications into a cloud computing environment (cloud environment, cloud). A cloud service enables software developers to deploy user applications to run within the cloud environment. When a user application is deployed to the environment, a deployment logic determines those aspects of the application, such as certain service usages, that may be incompatible with features provided by the environment, or that should use a particular cloud service, and automatically ports the application, including the use of one or more handlers or extensions, for use within the environment. For example, a user application may have been originally developed to use JAVAMAIL™, which presents a security risk in a cloud environment. To minimize such risk, the application can instead be ported to use, for example, a REST-based e-mail service supported by the cloud environment.

19 Claims, 5 Drawing Sheets

(51) Int. Cl.
*G06F 8/60* (2018.01)
*G06F 8/41* (2018.01)

(58) Field of Classification Search
USPC .................. 717/110, 140–143, 148, 121
See application file for complete search history.

(56) References Cited

U.S. PATENT DOCUMENTS

| | | | | |
|---|---|---|---|---|
| 7,337,436 B2* | 2/2008 | Chu | ............. | G06F 8/20 |
| | | | | 717/140 |
| 7,370,318 B1* | 5/2008 | Howe | ............. | G06F 8/4441 |
| | | | | 717/110 |
| 7,849,440 B1* | 12/2010 | Englehart | ............. | G06F 9/45504 |
| | | | | 715/762 |
| 7,913,237 B2* | 3/2011 | Acott | ............. | G06F 9/44589 |
| | | | | 717/140 |
| 8,464,279 B2* | 6/2013 | Gutjahr | ............. | G06F 9/542 |
| | | | | 709/223 |
| 8,631,387 B2* | 1/2014 | Henderson | ............. | G06F 8/24 |
| | | | | 717/108 |
| 8,706,881 B2* | 4/2014 | Ramu | ............. | G06F 9/44521 |
| | | | | 709/226 |
| 8,881,092 B2* | 11/2014 | Cope | ............. | G06F 21/10 |
| | | | | 717/101 |
| 8,886,777 B2* | 11/2014 | Salsburg | ............. | G06F 9/5072 |
| | | | | 709/203 |
| 8,938,800 B2 | 1/2015 | Bhargava et al. | | |
| 8,984,478 B2* | 3/2015 | Epstein | ............. | G06F 12/1475 |
| | | | | 717/110 |
| 8,997,070 B2* | 3/2015 | Klemenz | ............. | G06F 8/427 |
| | | | | 717/136 |
| 9,378,014 B2* | 6/2016 | Wilson | ............. | G06F 8/43 |
| 9,459,862 B2* | 10/2016 | Araya | ............. | G06F 8/76 |
| 9,465,608 B2* | 10/2016 | Araya | ............. | G06F 8/447 |
| 9,811,325 B2* | 11/2017 | Gass | ............. | G06F 8/51 |
| 9,871,800 B2 | 1/2018 | Subramanian et al. | | |
| 9,875,099 B2* | 1/2018 | Kosmiskas | ............. | G06F 8/52 |
| 2008/0016339 A1 | 1/2008 | Shukla | | |
| 2009/0282480 A1 | 11/2009 | Lee et al. | | |
| 2014/0075427 A1 | 3/2014 | Pallamreddy et al. | | |
| 2014/0283110 A1 | 9/2014 | Quong | | |
| 2015/0200968 A1 | 7/2015 | Bhargava et al. | | |
| 2015/0222620 A1 | 8/2015 | Subramanian et al. | | |

OTHER PUBLICATIONS

Burg et al, "A Self-Adaptive Deployment Framework for Service-Oriented Systems", ACM, pp. 208-217, 2011.*
Krupckzak et al, "Increasing the Portability and Re-Usability of Protocol Code", IEEE/ACM Transactions on Networking, vol. 5, No. 4, pp. 445- 459,1997.*
Sathyanathan et al, "Incremental Whole Program Optimization and Compilation ", IEEE, pp. 221-232, 2017.*
Charles et al, "Is dynamic compilation possible for embedded systems ?", ACM, pp. 90-83, 2015.*
Bernini et al, "A Software Architecture for the Deployment of Executable Transformation Models", ACM, pp. 47-51, 2009.*
Galik et al, "Generating Connectors for Heterogeneous Deployment", ACM, pp. 54-61, 2005.*
United States Patent and Trademark Office, Office Action dated Feb. 16, 2016 for U.S. Appl. No. 14/610,524, 13 Pages.
United States Patent and Trademark Office, Office Action dated Oct. 17, 2016 for U.S. Appl. No. 14/610,524, 10 Pages.
United States Patent and Trademark Office, Notice of Allowance dated May 10, 2017 for U. S. Appl. No. 14/610,524, 7 Pages.
United States Patent and Trademark Office, Notice of Allowance dated Sep. 15, 2017 for U.S. Appl. No. 14/610,524, 7 Pages.

* cited by examiner

SYSTEM AND METHOD FOR AUTOMATIC PORTING OF SOFTWARE APPLICATIONS INTO A CLOUD COMPUTING ENVIRONMENT

CLAIM OF PRIORITY AND CROSS-REFERENCE TO RELATED APPLICATIONS

This application claims the benefit of priority to U.S. Provisional Patent Application titled "SYSTEM AND METHOD FOR AUTOMATIC PORTING OF SOFTWARE APPLICATIONS INTO A CLOUD COMPUTING ENVIRONMENT", Application No. 62/188,280, filed Jul. 2, 2015; and is related to U.S. patent application titled "SYSTEM AND METHOD FOR PROVIDING APPLICATION SECURITY IN A CLOUD COMPUTING ENVIRONMENT", application Ser. No. 14/610,524, filed Jan. 30, 2015, published as U.S. Publication No. 2015/0222620; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing and software development, and are particularly related to a system and method for automatic porting of software applications upon deployment to a cloud computing or other environment.

BACKGROUND

The term "cloud computing" is generally used to describe a computing model which enables provisioning of software applications and on-demand access to shared computing resources, with minimal management effort. Examples of such environments include Oracle Cloud, which provides a comprehensive set of cloud services that enable software developers to build and deploy JAVA™-based user applications to run in the cloud.

However, in some instances when a user application is deployed to the cloud environment, it may be necessary to further adapt the application for use within that environment. These are some examples of the types of environment in which embodiments of the invention can be used.

SUMMARY

In accordance with an embodiment, described herein is a system and method for automatic porting of software applications into a cloud computing environment (sometimes referred to herein as a cloud environment, or cloud).

A cloud service enables software developers to deploy user applications to run within the cloud environment. When a user application is deployed to the environment, a deployment logic determines those aspects of the application, such as certain service usages, that may be incompatible with features provided by the environment, or that should use a particular cloud service, and automatically ports the application, including the use of one or more handlers or extensions, for use within the environment.

For example, a user application may have been originally developed to use JAVAMAIL™, which presents a security risk in a cloud environment. To minimize such risk, the application can instead be ported to use, for example, a REST-based e-mail service supported by the cloud environment.

DETAILED DESCRIPTION

Figure 1:
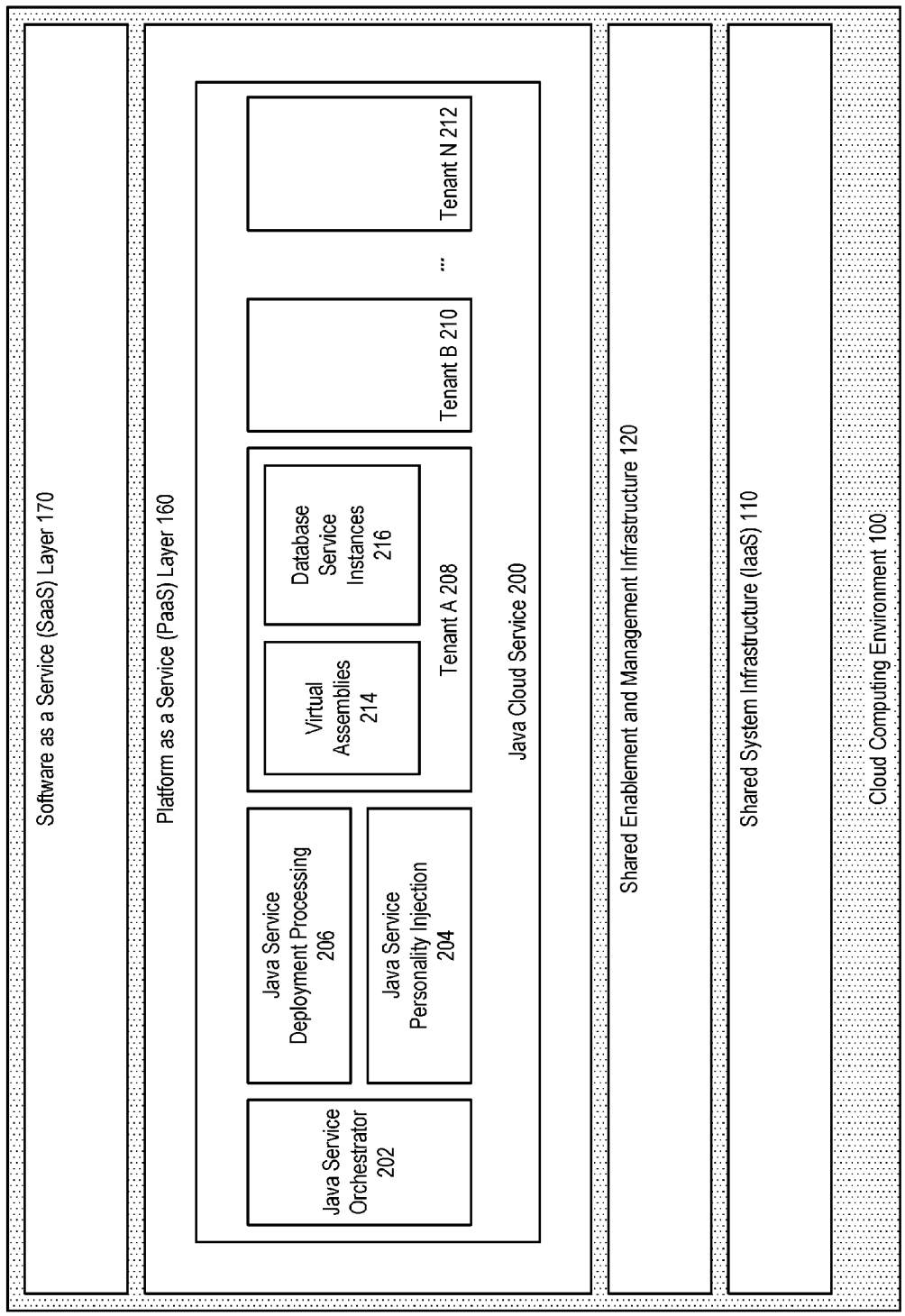
FIG. 1 illustrates an exemplary cloud computing environment which includes a Java cloud service component, in accordance with an embodiment.

As described above, a cloud computing environment (sometimes referred to herein as a cloud environment, or cloud) enables software developers to build and deploy user applications to run in the cloud environment. However, in some instances, it may be necessary to further adapt the application for use within that environment.

To address this, in accordance with an embodiment, described herein is a system and method for automatic porting of software applications into a cloud computing environment (cloud environment, cloud). A cloud service enables software developers to deploy user applications to run within the cloud environment. When a user application is deployed to the environment, a deployment logic determines those aspects of the application, such as certain service usages, that may be incompatible with features provided by the environment, or that should use a particular cloud service, and automatically ports the application, including the use of one or more handlers or extensions, for use within the environment.

For example, a user application may have been originally developed to use JAVAMAIL™, which presents a security risk in a cloud environment. To minimize such risk, the application can instead be ported to use, for example, a REST-based e-mail service supported by the cloud environment.

In accordance with an embodiment, the porting of the user application code can be performed in the background, such that the software developer need not be aware that their application has actually been modified.

For example, a user application code which was originally intended to use a JAVAMAIL™, or another SMTP-based e-mail service or API, which may not be supported by the cloud environment, can be automatically replaced upon deployment with a modified code which instead uses a REST-based e-mail service or API that is supported by that environment.

This provides a benefit in that the software developer does not need to make any code changes to their user application in their own runtime environment. Instead, a bytecode translation can be automatically performed upon application deployment, which is transparent from the developer's perspective.

In accordance with an embodiment, additional types of application porting or translation can be added over time, to address different types of use cases. For example, an application code developed by a cloud customer, which originally calls upon a particular cloud-centric service, can be automatically modified during deployment so that, if at some later point in time that particular service is unavailable, the modified code can be automatically ported to use an alternative cloud-centric service that actually is available. Similarly, this translation of the original application code can be performed transparently from the developer's (i.e., customer's) perspective.

In accordance with an embodiment, the process of automatic porting includes, during deployment of a user application to the cloud environment, analyzing the original bytecode of the user application, and replacing a portion of that bytecode with a modified code. This can be accomplished by instructing a bytecode analyzer/injector to look for a particular usage of a specific application program interface (API), or other type of service, within the original code, and replacing that found portion of code or usage, with a handler or other glue code that delegates service calls to an extension registered with the analyzer/injector.

When the handler or other glue code is later called by the user application, it can add an appropriate extension, for example, to use an alternative cloud-centric service, such as a REST-based e-mail service, or to trap a call to standard output (stdout), or perform some other action. Complex objects can also be returned, for example, to override a particular transport, or to perform custom actions.

In accordance with an embodiment, different extensions can be provided to support different rules, and can be used to provide a generic framework. For example, a first type of extension can be used to deploy a user application into a particular type of cloud environment (e.g., ORACLE CLOUD™), while a second type of extension can be used to support deployment of that same application into a different type of cloud environment.

As another example, different types of cloud environments may use different queuing services so, by providing different extensions, the system can be used to transparently translate between, e.g., JMS and AMAZON SQS™ queues, without the developer having to modify any of their user application code.

As another example, the technique allows a user application to be bound to one type of cloud environment, and then call into another type of cloud environment.

FIG. 1 illustrates an exemplary cloud computing environment 100 which includes a JAVA™ cloud service (JCS) component, in accordance with an embodiment, and further includes a combination of one or more shared Infrastructure as a Service (IaaS) 110, enablement and management infrastructure 120, Platform as a Service (PaaS) 160, and/or Software as a Service (SaaS) 170 layers, which together can be delivered as service layers for use by consumers.

In accordance with an embodiment, the IaaS layer can include a shared database hardware, e.g., an EXADATA™ machine; and/or a shared application server hardware, e.g., an EXALOGIC™ machine; while the SaaS layer can include one or more SaaS services, e.g., enterprise applications; and the PaaS layer can include one or more PaaS services, e.g., a Java cloud service 200 that enables the creation of JAVA™ service instances, for use in provisioning and deployment of JAVA™-based software applications.

In accordance with an embodiment, the JAVA™ cloud service can include a service orchestrator 202, and one or more components for personality injection 204, deployment processing 206, and creation of tenant instances 208, 210, 212, each with one or more virtual assemblies 214 and database service instances 216. Additional resources and services, for example, a database service, can be associated with a service instance and software applications deployed to that instance, which can then run in the cloud similarly to how they might run in a traditional non-cloud environment.

In accordance with an embodiment, upon a user application being received for deployment to the cloud environment, an application compiler can determine, for certain API or other service usages expressed, for example, as method invocations within the source code of the user application, one or more service usages and associated actions. The application compiler can then modify the user application code, by replacing the original or found service usage with a handler or other glue code which, during runtime, communicates with one or more extensions to perform the appropriate action.

Figure 2:
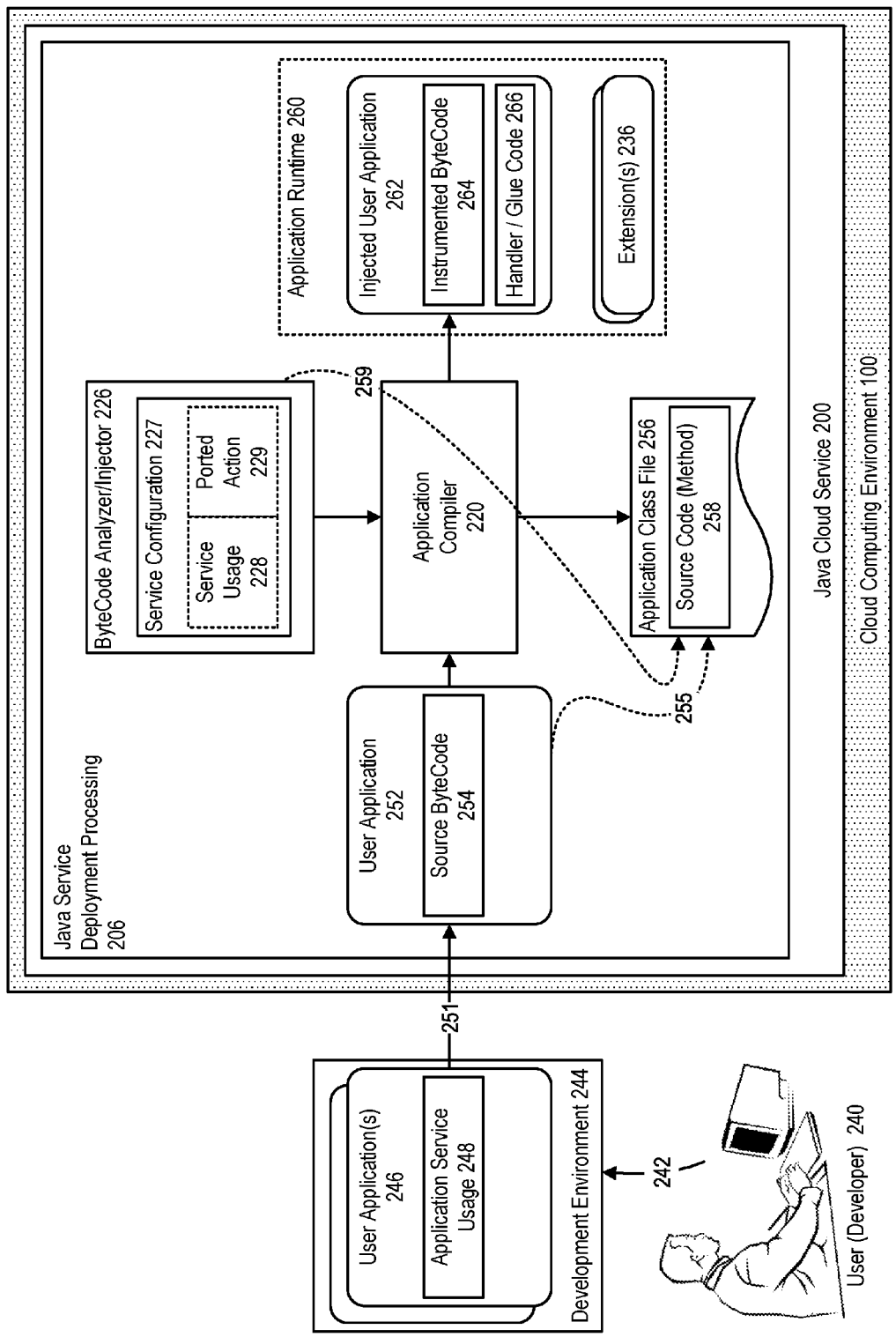
FIG. 2 illustrates a system for automatic porting of software applications into a cloud computing or other environment, in accordance with an embodiment.

FIG. 2 illustrates a system for automatic porting of software applications into a cloud computing or other environment, in accordance with an embodiment.

In accordance with an embodiment, an administrator can configure a bytecode analyzer/injector 226 to recognize one or more service configurations 227, including a service usage 228 as might be found within a user application, and a specified associated action 229. Each of the one or more service configurations defines a service usage that may be found within source code of the software applications to be compiled and deployed, together with an associated action.

Examples of various actions that can be specified include: deny-inline—with this action, an access control exception is thrown before a method invocation; deny-replace—with this action, the method is replaced by another, replacement method from a handler or other glue code, which can deny the call after performing some work, such as logging or alerting; and forward—with this action, which is intended mainly for static, virtual or final invocations, a method invocation can be forwarded to another method or to an invocation handler, along with the context of the invocation, and it is left up to the "invoke" method on the invocation handler to determine whether to grant or deny the call.

In accordance with an embodiment, the service usages represent those usages that might be potentially used within a user application being deployed to the cloud environment, but which are either incompatible with features provided by the environment, or should be used with particular cloud services, and as such, when those usages are found to be present in a user application being deployed, they should be modified, to port that user application for use within the cloud environment.

In accordance with an embodiment, the administrator can also provide one or more extensions 236, which can be registered with the compiler framework, and selectively bound to user applications at runtime. Different types of extensions can be provided, for later selection and binding with the user application runtime, and can operate according to different strategies, to address different needs.

In accordance with an embodiment, a software development environment 244 can be used, by a software developer or other user 240, to develop 242 a software application, generally referred to herein as a user application 246, which includes one or more application service usages 248.

The user can provide 251 the user application, which was developed within the development environment, to the JAVA™ service deployment processing component, to be deployed to the cloud environment.

For example, in the context of a JAVA™ cloud service, a user application 252 can be received as input into the Java service deployment processing component, wherein the user application includes one or more service usages expressed as method invocations within the source bytecode 254 of the user application. The input source code can be provided 255, for example, as a class file 256 that includes the method source code 258, which the application compiler 220 can then access during compilation.

During compilation of the user application, the compiler, together with the bytecode analyzer/injector, determines 259, for one or more of the method invocations found within the source code of the user application, matching service configurations including service usages and associated actions. The compiler can then modify the software application during compilation, according to the matching service configuration and associated action, including replacing the service usage within the source code of the software application, with a modified code for use within the computing environment, for example by injecting the user application, so that the application runtime 260 for the injected user application 262 includes a corresponding instrumented code 264 and handler or other glue code 266.

In accordance with an embodiment, a method invocation in the input source class file can be replaced by a method generated in the handler or other glue code, so that the user application will instead invoke into the handler, which in turn calls any registered extensions. The registered extensions can then perform the actual invocation, on behalf of the user application.

In accordance with an embodiment, the handler or other glue code can then be compiled and packaged together with the user application, so that it can bind 270 the user application with appropriate extensions.

Figure 3:
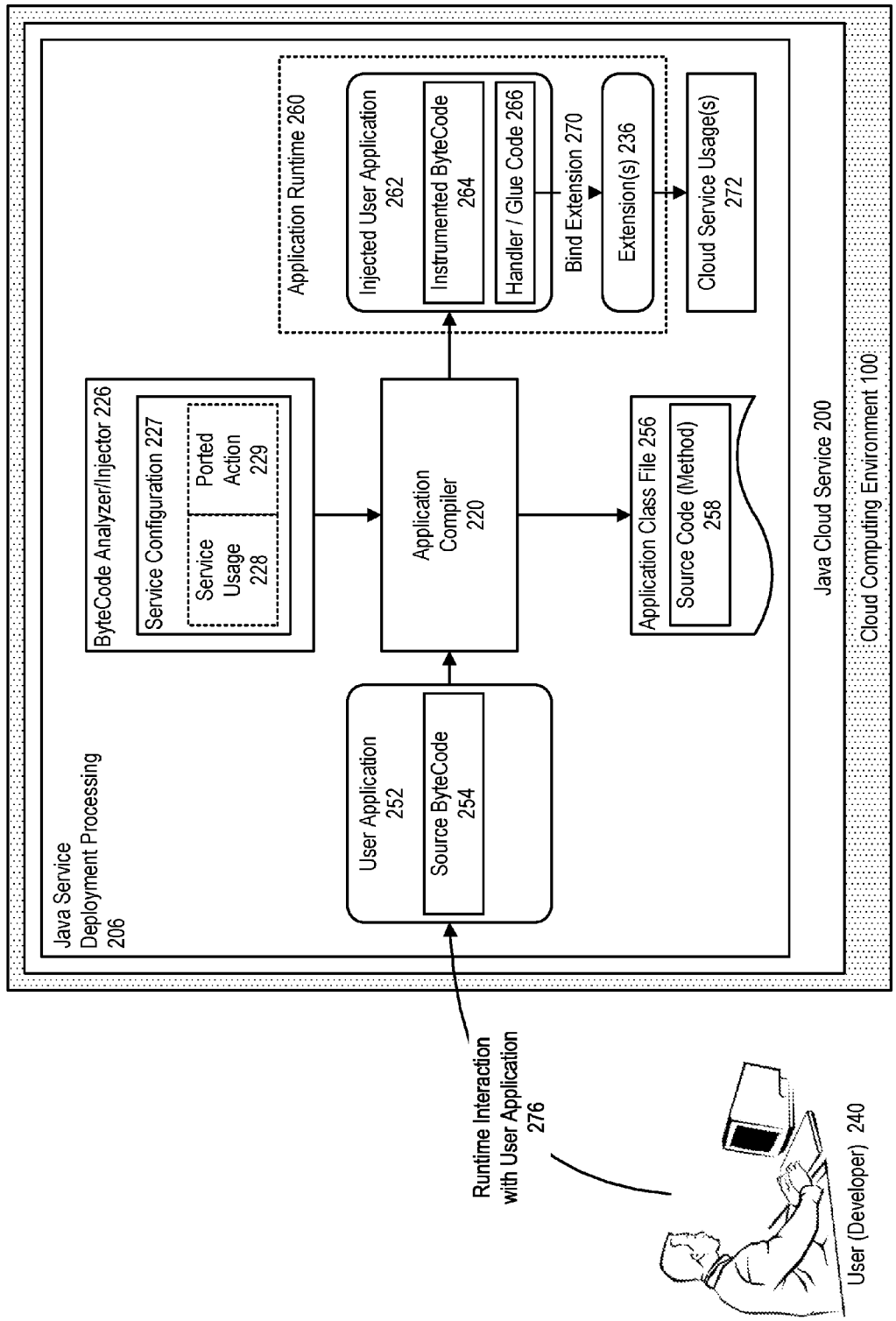
FIG. 3 further illustrates a system for automatic porting of software applications into a cloud computing or other environment, in accordance with an embodiment.

FIG. 3 further illustrates a system for automatic porting of software applications into a cloud computing or other environment, in accordance with an embodiment.

In accordance with an embodiment, the handler or other glue code can bind the user application with extensions, including taking appropriate actions for each service usage in the runtime, so that the user application is ported, for example, for use with a cloud service 272 within the cloud environment.

The compiler framework and extensions can be used to support service usages in an extensible manner in a cloud or other environment, including a JAVA™-based or other cloud environment.

Figure 4:
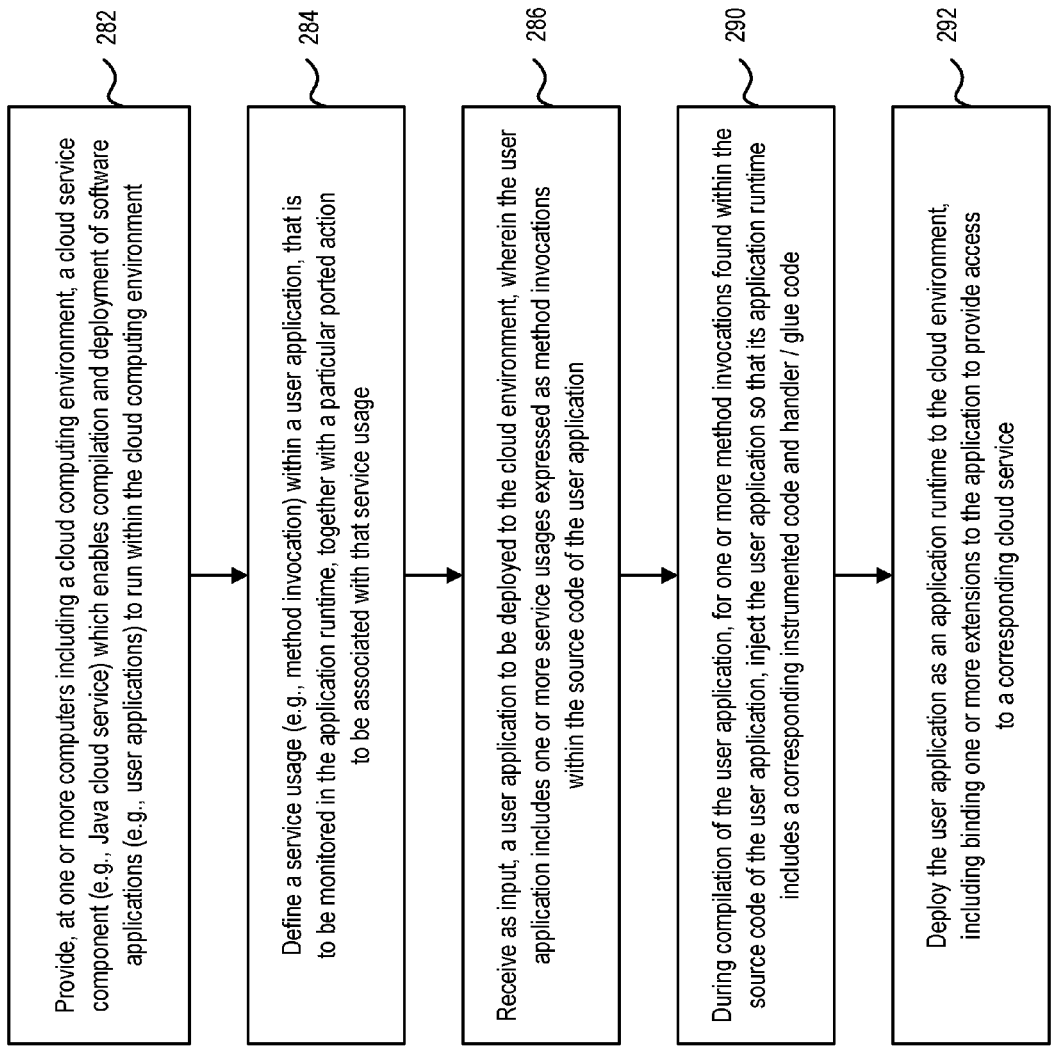
FIG. 4 illustrates a method for automatic porting of software applications into a cloud computing or other environment.

FIG. 4 illustrates a method for automatic porting of software applications into a cloud computing or other environment.

In accordance with an embodiment, at step 282, a cloud service component (e.g., a JAVA™ cloud service) which enables compilation and deployment of software applications (e.g., user applications) is provided at one or more computers including a cloud computing environment.

At step 284, a service usage (e.g., a method invocation) is defined within a user application that is to be monitored in the application runtime, together with a particular action to be associated with that service usage.

At step 286, a user application is received as user input to be deployed to the cloud environment, wherein the user application includes one or more service usages expressed as method invocations within the source code of the user application.

At step 290, during compilation of the user application, for one or more method invocations found within the source code of the user application, the user application is injected so that its application runtime includes a corresponding instrumented code and handler or other glue code.

At step 292, the user application is deployed as an application runtime to the cloud environment, including binding one or more extensions to the application to provide access to a corresponding cloud service.

Example Use Case A. Support for E-Mail Via Notification Service

Figure 5:
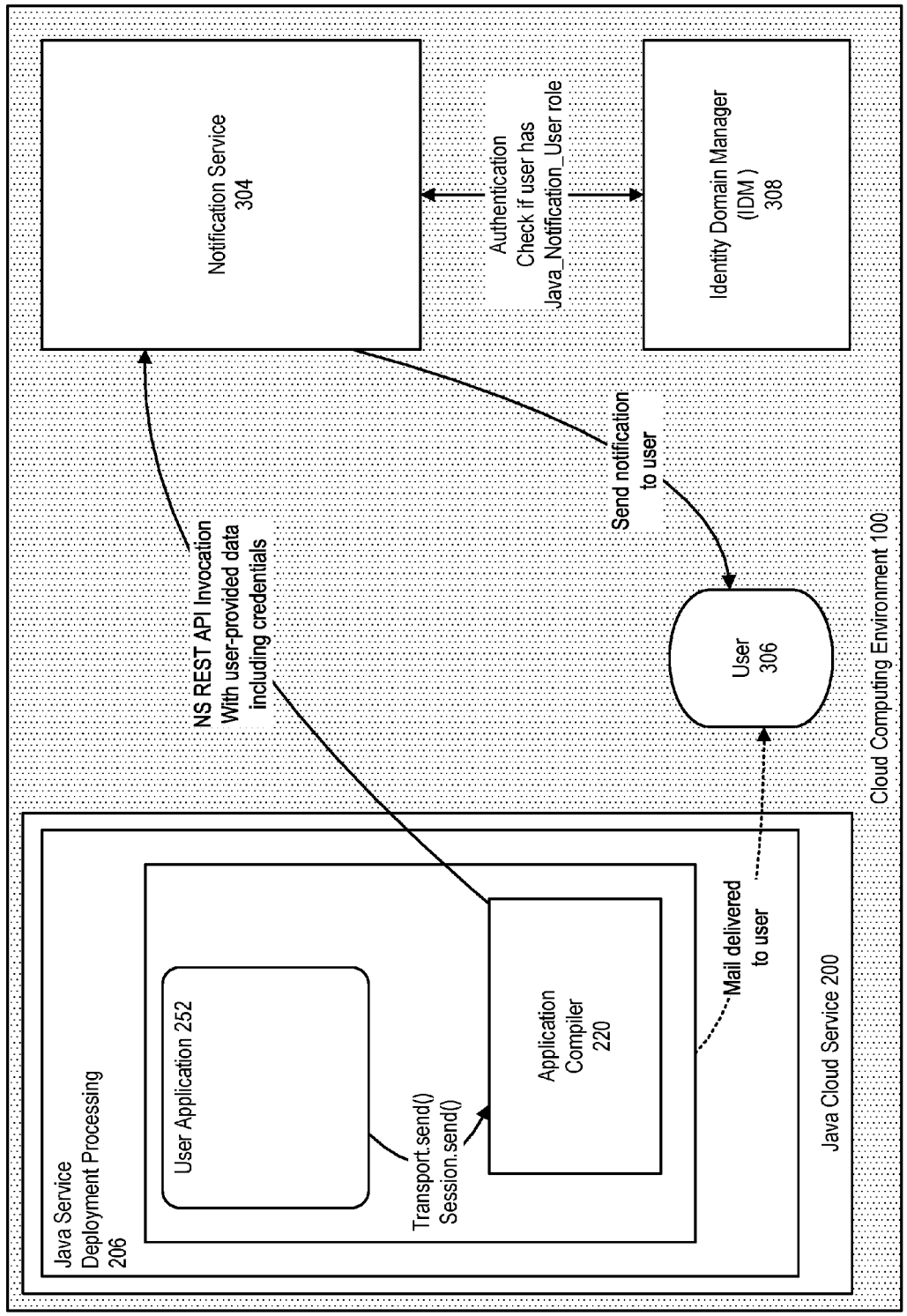
FIG. 5 illustrates an example use case, including the use of a notification service that allows user applications to trigger e-mails from a user application, in accordance with an embodiment.

FIG. 5 illustrates an example use case, including the use of a notification service that allows user applications to trigger e-mails from a user application, in accordance with an embodiment.

In accordance with an embodiment, the system can be used, for example, to provide a JAVA™ cloud service or cloud-centric JAVAMAIL™ punch out via a notification service, which enables a user application to trigger e-mails from within the application, and send those e-mails to preferred destinations, including porting the user application to replace certain function calls within the application, with calls to the cloud-centric service.

In some cloud or other environments, certain services such as JAVAMAIL™ may either not be supported, or the JAVAMAIL™ API may be selectively blocked by the security framework, for security reasons. For example, the JAVAMAIL™ API uses SMTP connections (i.e., a direct socket connection to one or more SMTP hosts), which provides a security risk to those SMTP hosts.

In recognition of such risks, in a cloud environment, e-mail services are more typically offered by REST/HTTP connections. However, some user applications may need a mechanism of sending e-mails from their application to the users of the application, or to outside entities, and those applications may have been originally developed to use the JAVAMAIL™ API and its function calls.

In accordance with an embodiment, a multi-layered approach is provided. At the application level, the JAVAMAIL™ API remains open to the user applications, which can continue to use the JAVAMAIL™ API to set information and call methods to prepare to send out the e-mail. However, once this has been accomplished, the system can port the application, using the above approach, to intercept the JAVAMAIL™ send calls, and to instead invoke a notification service 304 REST API, which will do the actual work of sending out e-mails to the respective users 306 set by the application.

In accordance with an embodiment, a quota or limit can be set on every user to restrict the number of e-mails sent based on the size of the services they have. The authentication information provided by the user at the application level is tunneled to the notification service, which uses it for authenticating the user and for quota management.

Authentication of the user sending out e-mails can be performed by the notification service, by checking if the user has a specific role. This can be accomplished by validating the user using, for example, an identity domain manager (IDM) 308. For this purpose the user can create a role named Java_Notification_User at the identity domain level, and associate the user to this role. Once this is complete, they can use those credentials to send out e-mails.

Since this feature uses internal services which need authentication, some specific actions are required from the user (e.g., customer) before using the feature, including that the user should have the 'Java_Notification_User' role assigned. Creating a new user specifically to send out notifications has its advantages, since even if the credentials are compromised, the only thing an attacker can do is send out e-mails, and cannot destroy the service, which might be the case if a privileged user was used to send out e-mails.

In accordance with an embodiment, with a credential store, the user can store their username/password into the credential store with a specific key associated to it.

```
java    -jar javacloud.jar set-credential
        -a http://slcn17vmf0110.c9dev1.oraclecorp.com:7703/
        -user system
        -password Welcome1
        -id usoracle89310
        -si katrina
        -keyuser foo
        -keypassword foobar
        -key katrina
```

In the user application, a security API (e.g., Oracle Platform Security Services, OPSS) can be used to get the credentials from the credential store, using the keys associated to the credentials. Below is an exemplary code example which can be used in the application, to get the credentials:

```
import oracle.security.jps.service.credstore.Credential;
import oracle.security.jps.service.credstore.CredentialFactory;
import oracle.security.jps.service.credstore.CredentialStore;
import oracle.security.jps.service.credstore.PasswordCredential;
String map = "user.custom.map";
String mykey = "katrina";
CredentialStore credentialStore =
credentialStore = oracle.security.jps.service.JpsServiceLocator.
getServiceLocator( ).
        lookup(oracle.security.jps.serv ice.credstore.CredentialStore.class);
out.println("Accessing credential");
Credential cred = credentialStore.getCredential(map, mykey);
out.println("Password got:" + cred);
if (cred != null) {
    out.println("Password got:" + new
            String(((PasswordCredential)cred).getPassword( )));
}
```

Instead of using a credential store, the user can use, for example, a wallet, or storage in a database, and then retrieve it in the user application code, and pass it on.

When all the above steps are complete, the system is ready to trigger e-mails for the user application. The username and password are the values which will either be retrieved from the credential store, or set by the user according to their choices (e.g., wallet, or database).

```
Authenticator auth = new Authenticator( ) {
    public PasswordAuthentication getPasswordAuthentication( ) {
        return new PasswordAuthentication(userName, password);
    }
};
```

```
Session session = Session.getInstance(props);
session.setDebug(debug);
try {
        InternetAddress[ ] address =
        {new InternetAddress("user1@oracle.com")};
    MimeMessage msg = new MimeMessage(session);
    msg.setFrom(new InternetAddress("javamail@oracle.com"));
    msg.setRecipients(Message.RecipientType.TO, address);
    msg.setSubject("JavaMail APIs Test");
    msg.setSentDate(new Date( ));
    msg.setText(msgText);
    Transport transport = session.getTransport("smtp");
    transport.connect(userName, password);
    // Using authentication in an instance of Transport class instead of session
    transport.sendMessage(msg, address );
```

When the user application calls transport.sendMessage( ), the system will invoke the notification service REST API, along with all the data provided in the application by the user, including the credentials which will be used for authenticating the user who wants to send out e-mails. The notification service will then trigger notifications to all the recipients.

In accordance with an embodiment, each user quota can be based on the kind of service the user has access to, or is associated with. For example, the user can be classed within one of the categories: Basic, Standard, or Enterprise. Based on this, the user is assigned a fixed e-mail quota, beyond which the user will not be able to send further e-mails. If the user wants to send out more e-mails, then the user can upgrade their service, and its quota will be upgraded as well.

In accordance with an embodiment, the system overrides the javax. mail.Transport, with a cloud-specific transport which includes an HTTP-based REST call to the notification service. Consider the following code, using the javax.mail API:

```
Session session = Session.getInstance(props);
InternetAddress[ ] address = { new InternetAddress
("user1@oracle.com")};
MimeMessage msg = new MimeMessage(session);
msg.setFrom(new InternetAddress("javamail@oracle.com"));
msg.setRecipients(Message.RecipientType.TO, address);
msg.setSubject("JavaMail APIs Test");
msg.setSentDate(new Date( ));
msg.setText("Katrina is the greatest");
Transport transport = session.getTransport("smtp");
transport.connect("jaas_appid", "Welcome1");
transport.sendMessage(msg, address);
```

In accordance with an embodiment, the code "Transport transport=session.getTransport("smtp");" will be handled in a cloud-specific way by a handler or other glue code.

Service Configuration

In accordance with an embodiment, the compiler will translate this code based on the following configuration:

```
<invoke-virtual static-class-match="true" action-id="POLICY-ID-270"
    rule-type="UTILITY" message-id="Getting Cloud Transport.">
    <clazz>javax.mail.Session</clazz>
    <method all-overloads="true">
        <methodname>getTransport</methodname>
    </method>
    <runtime-action>
        <forward>
        <runtime-forward-class factory="false">
        <clazz>
        oracle.cloud.jcs.scanning.impl.extension.mail.JavaMailAPIsHandler
        </clazz>
        </runtime-forward-class>
        </forward>
    </runtime-action>
</invoke-virtual>
```

Generated Bytecode that Replaces the Original Bytecode
In accordance with an embodiment, the compiler will translate the original code into:

```
147: invokespecial #100 // Method java/util/Date."<init>":( )V
150: invokevirtual #104 // Method
    javax/mail/internet/MimeMessage.setSentDate:(Ljava/util/Date;)V
153: aload 6
155: ldc #106 // String Katrina is the greatest
157: invokevirtual #109 // Method
    javax/mail/internet/MimeMessage.setText:(Ljava/lang/String;)V
160: aload 4
162: ldc #111 // String smtp
164: invokestatic #117 // Method oracle/cloud/jcs/security/SecurityManager_HLZKM88721
    kpsve.___fwd___1BiqWi7nj1qH0DX0FCKxFbN6Jkg_R8w___POLICY_ID_270:(Ljava/lang/Object;
    Ljava/lang /String;)Ljavax/mail/Transport;
167: astore 7
169: aload 7
171: ldc #119 // String jaas_appid
173: ldc #121 // String Welcome1
175: invokevirtual #127 // Method
    javax/mail/Transport.connect:(Ljava/lang/String;Ljava/lang/String;)V
178: aload 7
180: aload 6
182: aload 5
184: invokevirtual #131 // Method
    javax/mail/Transport.sendMessage:(Ljavax/mail/Message;[Ljavax/mail/Address;)V
```

Generated Glue Code
In accordance with an embodiment, the following glue code is also generated to handle the call in oracle.cloud.jcs.security.SecurityManager_HLZKM88721kpsve.java:

```
public static
javax.mail.Transport___fwd___1BiqWi7nj1qH0DX0FCKxFbN6Jkg___R8w_POLICY_ID_270
(java.lang.Object arg0,java.lang.String arg1) throws java.lang.Throwable{
try{
    java.lang.reflect.InvocationHandler handler = new
    oracle.cloud.jcs.scanning.impl.extension.mail.JavaMailAPIsHandler( );
    if (oracle.cloud.jcs.scanning.compiler.api.handler.
    InvocationContextReceiver.class.isAssignableFrom(handler.getClass( ))){
        oracle.cloud.jcs.scanning.compiler.api.config.HotSpotDefinition defn = new
        oracle.cloud.jcs.scanning.compiler.api.config.HotSpotDefinition( ){
@Override
    public String getActionId( ){
    return "POLICY-ID-270";
    }
@Override
    public Class getSecurityManagerClass( ){
    return oracle.cloud.jcs.security.SecurityManager_HLZKM88721kpsve.class;
    }
@Override
    public String getMessage( ){
    return "Handling of sending emails. ...";
    }
```

```
@Override
    public java.util.Properties getProperties( ){
    java.util.Properties p = null;
    p = new java.util.Properties( );
    return p;
    }
};
((oracle.cloud.jcs.scanning.compiler.api.handler.InvocationContextReceiver)
    handler).setHotSpotConfiguration(defn);
}
if (arg0 == null){
    throw new java.lang.NullPointerException("The invocation was subject
    to a run-time security validation. However, the validation could not be
    performed as the owner was null.");
    } java.lang.reflect.Method method =
    _—findM_B9x(arg0.getClass( ),"getTransport",new
    Class[ ]{Class.forName("java.lang.String")});
    return (javax.mail.Transport)handler.invoke(arg0, method,new Object[ ]{arg1});
    //Returns Cloud specific Transport Object.
}catch (java.lang.Throwable t){
    throw oracle.cloud.jcs.scanning.impl.alert.AlertRoot.alertThrowable
    (t, "POLICY-ID-270");
    }
}
```

In accordance with an embodiment, the cloud-centric transport class can be implemented as follows:

```
package oracle.cloud.jcs.scanning.impl.extension.mail;
import javax.mail.*;
import javax.mail.internet.MimeMessage;
import java.lang.reflect.Field;
import java.lang.reflect.Method;
import java.util.Properties;
import java.util.ServiceLoader;
import oracle.cloud.jcs.scanning.compiler.api.mail.CloudMailSender;
import java.util.logging.Level;
import java.util.logging.Logger;
import java.util.ServiceConfigurationError;
import java.util.Date;
import java.util.Map;
import java.util.HashMap;
public class CloudMailTransport extends Transport {
    Transport transport = null;
    Session session = null;
    ClassLoader classLoader = null;
    String notificationServiceBaseUrl = null;
    static final Logger logger = Logger.getLogger(CloudMailTransport.class
        .getName( ));
    private static <T> T loadService(Class<T> api, ClassLoader classLoader) {
    T result = null;
    ServiceLoader<T> impl = ServiceLoader.load(api, classLoader);
    for (T loadedImpl : impl) {
    result = loadedImpl;
    if (result != null)
        break;
    }
if (result == null)
    throw new RuntimeException("Cannot find implementation for: " + api);
    return result;
    }
String getUserName( ) {
    return userName;
    }
String getPassword( ) {
    return password;
    }
String getNotificationServiceBaseUrl( ) {
    return notificationServiceBaseUrl;
    }
```

```
private String userName = null;
private String password = null;
public CloudMailTransport(Session session, Transport transport,
ClassLoader classLoader, String notificationServiceBaseUrl) {
    super(session, transport.getURLName( ));
    this.transport = transport;
    this.session = session;
    this.classLoader = classLoader;
    this.notificationServiceBaseUrl = notificationServiceBaseUrl;
    }
@Override
    public void connect(String user, String password) {
    this.userName = user;
    this.password = password;
    }
@Override
    public void connect( ) throws MessagingException {
    try {
        Field authenticatorField = Session.class
    .getDeclaredField("authenticator");
    authenticatorField.setAccessible(true);
    Authenticator auth = (Authenticator) authenticatorField
    .get(session);
    if (auth == null) {
        throw new Exception("Authenticator is not set.");
    }
    Method method = Authenticator.class
    .getDeclaredMethod("getPasswordAuthentication");
    method.setAccessible(true);
    PasswordAuthentication passAuth = (PasswordAuthentication) method
    .invoke(auth, null);
    if (passAuth == null) {
        throw new Exception("PasswordAuthentication is not set.");
    }
    this.userName = passAuth.getUserName( );
    this.password = passAuth.getPassword( );
    } catch (Exception e) {
    throw new MessagingException("Unable to connect:", e);
    }
}
    @Override
    public void connect(String host, String user, String password) {
    this.userName = user;
    this.password = password;
    }
public synchronized void connect(String host, int port, String user,
String password) throws MessagingException {
    this.userName = user;
    this.password = password;
}
protected boolean protocolConnect(String host, int port, String user,
String password) throws MessagingException {
    this.userName = user;
    this.password = password;
    return true;
}
public boolean isConnected( ) {
    return true;
}
@Override
    public void sendMessage(Message message, Address[ ] addresses)
    throws MessagingException {
    String mailFrom = null, mailTo = null;
    //Check if jersey client packages are avaialble
    checkClass( );
    MimeMessage mimeMessage;
if (message instanceof MimeMessage) {
    mimeMessage = (MimeMessage) message;
    } else {
    mimeMessage = new MimeMessage(session);
    mimeMessage.addFrom(message.getFrom( ));
    mimeMessage.setRecipients(Message.RecipientType.TO,
    message.getAllRecipients( ));
    mimeMessage.setSubject(message.getSubject( ));
    mimeMessage.setSentDate(new Date( ));
    }
```

```
Map<String, String> params = new HashMap<String, String>( );
params.put(CloudMailSender.USERNAME,getUserName( ));
params.put(CloudMailSender.PASSWORD,getPassword( ));
params.put(CloudMailSender.NS_BASE_URL,getNotificationServiceBaseUrl( ));
CloudMailSender CloudMailSender = loadService(CloudMailSender.class,
classLoader);
CloudMailSender.sendMessage(mimeMessage, addresses, params);
}
private void checkClass( ) throws MessagingException {
try {
    Class cloudMailSenderImplClass = Class.forName(
    "com.sun.jersey.api.client.Client", true,
    Thread.currentThread( ).getContextClassLoader( ));
} catch (ClassNotFoundException cne) {
    logger.info
    ("E-mails will not be triggered as com.sun.jersey.api.client. Client and jersey
    classes were not found in the classpath. Please refer to the documentation on
    how to refer to the jax-rs library deployed on the service thorugh entries in
    the application weblogic.xml");
    throw new MessagingException("Jersey jars not found in the class-path");
    }
 }
}
          * * * * * * * * *
```

Example Use Case B: Controlling System.out

In accordance with an alternative embodiment or use case, the system can be used, for example, to improve diagnosability of a user application, including porting the user application to replace certain function calls within the application to output information, with calls to a cloud-centric service.

Some user applications might be developed to log their content with, for example, System.out.println( ) and exception.printStackTrace( ). However, these may not be available in the service logs that the users have access to. Instead, using the above approach, a selection of such calls can instead be intercepted, and then written through a JDK logger. When the message is written with JDK loggers in this manner, the messages automatically end up in the service logs.

Service Configuration

In accordance with an embodiment, an example configuration is illustrated below:

```
<invoke-virtual static-class-match="true" action-id="POLICY-ID-2400"
    messaged-id="System.out.println(msg) are redirected to JDK
    logger.">
    <clazz>java.io.PrintStream</clazz>
    <method allOverloads="false" argsMatchPolicy="EXACT">
        <methodname>print|println</methodname>
        <arg>**</arg>
    </method>
    <runtime-action>
        <forward>
            <runtime-forward-class factory="true">
            <clazz>oracle.cloud.jcs.scanning.impl.extension.
                SystemOutRedirector</clazz>
            </runtime-forward-class>
```

```
        </forward>
    </runtime-action>
</invoke-virtual>
<invoke-virtual
action-id="POLICY-ID-2401"messaged-id="e.printStackTrace( ) to
    std out and err is redirected.">
    <clazz>java.lang.Throwable</clazz>
    <method allOverloads="true">
        <methodname>printStackTrace</methodname>
    </method>
    <runtime-action>
        <forward>
            <runtime-forward-class factory="true">
            <clazz>oracle.cloud.jcs.scanning.impl.extension.
                PrintStackTraceRedirector</clazz>
            </runtime-forward-class>
        </forward>
    </runtime-action>
</invoke-virtual>
```

Input Source

In accordance with an embodiment, an example input source is illustrated below:

```
public static void main(String[ ] s) throws Exception {
    System.out.println("This message now will show up in the service
        log.");
    new Exception("This will also show up.").printStackTrace( );
    new Exception("Even this...").printStackTrace(System.err);
}
```

Generated Bytecode that Replaces the Original Bytecode

In accordance with an embodiment, an example generated bytecode is illustrated below:

```
main([Ljava/lang/String;)V
00000 String::GETSTATIC java/lang/System.out : Ljava/io/PrintStream;
00001 String: PrintStream: LDC "This message now will show up in the service log."
00002 String: PrintStream String: INVOKESTATIC
    oracle/cloud/security/GeneratedSecurityManager_A0nVE.
        _—fwd_—6c7em4DqOr2Jx1XxEXM31CkWLIY_—E8b_POLICY_ID_2400
        (Ljava/io/PrintStream;Ljava/lang/String;)V
00003 String::NEW java/lang/Exception
00004 String: Exception: DUP
```

-continued

```
00005 String: Exception Exception: LDC "This will also show up."
00006 String: Exception Exception String: INVOKESPECIAL java/lang/Exception.<init>
     (Ljava/lang/String;)V
00007 String: Exception: INVOKESTATIC
     oracle/cloud/security/GeneratedSecurityManager_A0nVE.
     _—deny_or_fwd_—6c7em4DqOr2Jx1XxEXM31CkWLIY_—E8b_POLICY_ID_2401
     (Ljava/lang/Exception;)V
00008 String::NEW java/lang/Exception
00009 String: Exception: DUP
00010 String: Exception Exception: LDC "Even this..."
00011 String: Exception Exception String: INVOKESPECIAL
     java/lang/Exception.<init> (Ljava/lang/String;)V
00012 String: Exception: GETSTATIC java/lang/System.err : Ljava/io/PrintStream;
00013 String: Exception PrintStream: INVOKESTATIC
     oracle/cloud/security/GeneratedSecurityManager_A0nVE.
     _—deny_or_fwd_—6c7em4DqOr2Jx1XxEXM31 CkWLIY_—E8b_POLICY_ID_2401
     (Ljava/lang/Exception;Ljava/io/PrintStream;)V
00014 String::RETURN
```

Generated Glue Code

In accordance with an embodiment, an example generated glue code is illustrated below:

```
// Source snippet only for handling e.printStackTrace( ) is given
 public static void _—deny_or_fwd_—6c7em4DqOr2Jx1XxEXM31CkWLIY
     _—E8b_POLICY_ID_2401 java.lang.Exception arg0,java.io.PrintStream arg1)
     throws java.lang.Throwable{
  if (_—getMatchingBaseClass_From_Object(arg0,"java\\.lang\\.Throwable") !=
       null){
       try{
// Compilation error will be seen if the class is not a factory.
       java.lang.reflect.InvocationHandler handler =
           oracle.cloud.jcs.scanning.impl.extension.
           PrintStackTraceRedirector.getOrCreateForwardHandler( );
       if (oracle.cloud.jcs.scanning.compiler.api.handler.
           InvocationContextReceiver.class.
           isAssignableFrom(handler.getClass( ))){
         oracle.cloud.jcs.scanning.compiler.api.
             config.HotSpotDefinition defn =
             new oracle.cloud.jcs.scanning.compiler.api.
             config.HotSpotDefinition( ){
           @Override
           public String getActionId( ){
             return "POLICY-ID-2401";
           }
           @Override
           public String getMessage( ){
     return "e.printStackTrace( ) to std out and err is redirected.";
           }
           @Override
           public java.util.Properties getProperties( ){
             java.util.Properties p = null;
             p = new java.util.Properties( );
             return p;
           }
         };
         ((oracle.cloud.jcs.scanning.compiler.api.handler.
             InvocationContextReceiver) handler).
             setHotSpotConfiguration(defn);
       }
       java.lang.reflect.Method method =
           _—find_X6k(arg0.getClass( ),"printStackTrace",new
           Class[ ]{java.io.PrintStream.class});
         handler.invoke(arg0, method,new Object[ ]{arg1});
     }catch (java.lang.Throwable t){
       throw t;
     }
  } else{
       try{
// Compilation error will be seen if the class is not a factory.
           java.lang.reflect.InvocationHandler handler =
               oracle.cloud.jcs.scanning.impl.extension.
               PassthroughInvocationHandler.
               getOrCreateForwardHandler( );
```

-continued

```
            java.lang.reflect.Method method =
                __—find_X6k(arg0.getClass( ),"printStackTrace",
                new Class[ ]{java.io.PrintStream.class));
            handler.invoke(arg0, method,new Object[ ]{arg1});
        }catch (java.lang.Throwable t){
            throw t;
        }
    }
}
```

Execution Results

In accordance with an embodiment, the actual JDK log format would depend on the JDK configuration and the handler makes no assumption on that. The example shown below is from an environment that has all default format.

```
May 07, 2013 5:56:17 PM
oracle.cloud.jcs.scanning.impl.extension.SystemOutRedirector invoke
INFO: This message now will show up in the service log.
May 07, 2013 5:56:17 PM
oracle.cloud.jcs.scanning.impl.extension.PrintStackTraceRedirector invoke
SEVERE: Redirected Throwable
java.lang.Exception: This will also show up.
    at injectiontest.Main.main(Main.java:20)
May 07, 2013 5:56:17 PM
oracle.cloud.jcs.scanning.impl.extension.PrintStackTraceRedirector invoke
SEVERE: Redirected Throwable
java.lang.Exception: Even this...
    at injectiontest.Main.main(Main.java:21)
              * * * * * * * * * *
```

Example Use Case C: Handling JNDI Lookups

In accordance with an alternative embodiment or use case, the system can be used, for example, to provide infrastructure services, such as messaging, with a way to perform a component name, for example, a JNDI lookup, including porting the user application to handle lookups differently when used in different environments.

This is applicable, for example, when the user application code performs the implicit lookup; and is not related to, for example, putting the JNDI names in a deployment descriptor with some system code, e.g., JPA (eclipse-link), performing the lookup.

In accordance with an embodiment, the system can handle lookups such as javax.naming.Context.lookup( ) and InitialContext.doLookup( ), for example by registering a top-level handler against the below configuration. Individual components, such as a messaging component, can register their handler using a property, e.g., "jndi.component.handler.chain", that can accept a comma-separated list of classes that also implement java.lang.reflect. Invocation Handler. The top-level handler (oracle.cloud.jcs.scanning.impl. extension.JNDILookupHandler) instantiates a list of handlers, and delegates the lookup call to them, in the order as registered. If a service handler does not want to handle the lookup, (for example, it does not recognize the JNDI name), then it can return null, which passes the control to the next registered handler. If no handler is registered, or if no handler has returned a non-null value, then the top-level handle acts like a pass-through, and just performs a user lookup. If a handler returns a non-null value, then that value will be returned to the user application.

In accordance with an embodiment, a plurality of cloud environments may have the same type of resource component (such as a data source, JMS connection factory, etc.), with each bound against different JNDI lookup names for that environment. Typically, a user application would need to modify the lookup names it uses, for each of those different environments. However, using the above approach, the system can handle the JNDI-lookups based on the particular environment, and avoid the need for re-configuring the user application.

Service Configuration

In accordance with an embodiment, an example configuration is illustrated below:

```
<!-- Global Properties-->
<property name="jndi.component.handler.chain">
        <value>oracle.cloud.messaging.JNDILookupHandler,
                oracle.cloud.ejb.JNDILookupHandler</value>
</property>
<invoke-static action-id="POLICY-ID-122" messaged-id="JNDI lookup handling.">
        <clazz>javax.naming.InitialContext</clazz>
        <method all-overloads="false" args-match-policy="EXACT">
                <methodname>doLookup</methodname>
                <arg>**</arg>
        </method>
        <properties>
                <property name="jndi.component.handler.chain">
                        <value>${jndi.component.handler.chain}</value>
                </property>
        </properties>
        <runtime-action>
                <forward>
                        <runtime-forward-class factory="true">
                                <clazz>oracle.cloud.jcs.scanning.impl.extension.JNDILookupHandler</clazz>
                        </runtime-forward-class>
                </forward>
        </runtime-action>
</invoke-static>
```

```
<invoke-interface action-id="POLICY-ID-1201" messaged-id="JNDI lookup handling.">
    <clazz>javax.naming.Context</clazz>
        <method all-overloads="false" args-match-policy="EXACT">
            <methodname>lookup|lookupLink</methodname>
                <arg>**</arg>
        </method>
        <properties>
            <property name="jndi.component.handler.chain">
                <value>${jndi.component.handler.chain}</value>
            </property>
        </properties>
    <runtime-action>
        <forward>
            <runtime-forward-class factory="true">
            <clazz>oracle.cloud.jcs.scanning.impl.extension.JNDILookupHandler</clazz>
            </runtime-forward-class>
        </forward>
    </runtime-action>
</invoke-interface>
```

Input Source

In accordance with an embodiment, an example input source is illustrated below:

```
public static void main(String[ ] s) throws Exception {
    InitialContext context = new InitialContext( );
    Object obj = context.lookup("jdni-name-sampe");
}
```

Generated Bytecode that Replaces the Original Bytecode

In accordance with an embodiment, an example generated bytecode is illustrated below:

```
main([Ljava/lang/String;)V
00000 String. . :: NEW javax/naming/InitialContext
00001 String. . : InitialContext :         DUP
00002 String. . : InitialContext InitialContext: INVOKESPECIAL
    javax/naming/InitialContext.<init> ( )V
00003 String . . : InitialContext : ASTORE 1
00004 String InitialContext . . : : ALOAD 1
00005 String InitialContext . . : InitialContext : LDC "jdni-name-sampe"
00006 String InitialContext . . : InitialContext String: INVOKESTATIC
    oracle/cloud/security/GeneratedSecurityManager_G3wDJ.
    _—deny_or_fwd_—CU2JBgaKx76I4OFHzPh8m
    Rk704U_—P1j_POLICY_ID_1201
    (Ljavax/naming/InitialContext;Ljava/lang/String;)
    Ljava/lang/Object;
00007 String InitialContext . . : Object : ASTORE 2
00008 String InitialContext Object : : RETURN
```

Generated Glue Code

In accordance with an embodiment, an example from oracle/cloud/security/GeneratedSecurityManager_G3wDJ.java can be:

```
public static java.lang.Object
    _—deny_or_fwd_—CU2JBgaKx76I4OFHzPh8mRk704U_—P1j_
    POLICY_ID_1201 (javax.naming.InitialContext arg0,java.lang.String arg1)
    throws java.lang.Throwable{
if (_—getMatchingBaseClass_From_Object(arg0,"javax\\.naming\\.Context")
            != null){
    try{
// Compilation error will be seen if the class is not a factory.
        java.lang.reflect.InvocationHandler handler =
                oracle.cloud.jcs.scanning.impl.extension.
                JNDILookupHandler.getOrCreateForwardHandler( );
        if (oracle.cloud.jcs.scanning.compiler.api.handler.
                InvocationContextReceiver.class.
                isAssignableFrom(handler.getClass( ))){
            oracle.cloud.jcs.scanning.compiler.api.config.
                HotSpotDefinition defn = new
                    oracle.cloud.jcs.scanning.compiler.api.
                    config.HotSpotDefinition( ){
                @Override
                public String getActionId( ){
                    return "POLICY-ID-1201";
                }
                @Override
                public String getMessage( ){
                    return "JNDI lookup handling.";
                }
                @Override
                public java.util.Properties getProperties( ){
                    java.util.Properties p = null;
                    p = new java.util.Properties( );
                    p.put("jndi.component.handler.chain",
                            "oracle.cloud.messaging.
```

-continued

```
                        JNDILookupHandler,oracle.cloud.
                        ejb.JNDILookupHandler");
                return p;
            }
        };
        ((oracle.cloud.jcs.scanning.compiler.api.handler.
                InvocationContextReceiver) handler).
                setHotSpotConfiguration(defn);
    }
    java.lang.reflect.Method method =
                _—find_I5r(arg0.getClass( ),"lookup",new
                Class[ ]{java.lang.String.class});
    return (java.lang.Object)handler.invoke(arg0,
                method,new Object[ ]{arg1});
    }catch (java.lang.Throwable t){
            throw t;
    }
} else{
    try{
    // Compilation error will be seen if the class is not a factory.
        java.lang.reflect.InvocationHandler handler =
                oracle.cloud.jcs.scanning.impl.extension.
                PassthroughInvocationHandler.getOrCreateForwardHandler( );
        java.lang.reflect.Method method = _—find_I5r(arg0.getClass( ),
                "lookup",new Class[ ]{java.lang.String.class));
        return (java.lang.Object)handler.invoke(arg0, method,
                new Object[ ]{arg1});
    }catch (java.lang.Throwable t){
            throw t;
    }
  }
}
```

Execution Results

In accordance with an embodiment, this example is provided without any valid handlers in the system. So, the top-level handler operates as a pass-through, performing the original action, which ends in an exception as expected.

```
May 08, 2013 12:33:20 PM
oracle.cloud.jcs.scanning.impl.extension.JNDILookupHandler createHandlers
SEVERE: Unable to find a handler as registered in the configuration.Ignoring the
handler:oracle.cloud.messaging.JNDILookupHandler
May 08, 2013 12:33:20 PM
oracle.cloud.jcs.scanning.impl.extension.JNDILookupHandler createHandlers
SEVERE: Unable to find a handler as registered in the configuration.Ignoring the
handler:oracle.cloud.ejb.JNDILookupHandler
Exception in thread "main" java.lang.reflect.InvocationTargetException
    at sun.reflect.NativeMethodAccessorImpl.invoke0(Native Method)
    at sun.reflect.NativeMethodAccessorImpl.invoke(NativeMethodAccessorImpl.java:57)
    at sun.reflect.DelegatingMethodAccessorImpl.invoke(DelegatingMethodAccessorImpl.
        java:43)
    at java.lang.reflect.Method.invoke(Method.java:601)
    at oracle.cloud.jcs.scanning.impl.extension.JNDILookupHandler.invoke
        (JNDILookupHandler.java:73)
    at oracle.cloud.security.GeneratedSecurityManager_Q8nKP._—deny_or_fwd
        _—CU2JBgaKx76I4OFHzPh8mRk704U_—H5k_POLICY_ID_1201(GeneratedSecurityManager
        _Q8nKP.java:274)
    at injectiontest.Main.main(Main.java:19)
Caused by: javax.naming.NoInitialContextException: Need to specify class name in
environment or system property, or as an applet parameter, or in an application
resource file: java.naming.factory.initial
    at javax.naming.spi.NamingManager.getInitialContext(NamingManager.java:662)
    at javax.naming.InitialContext.getDefaultInitCtx(InitialContext.java:307)
    at javax.naming.InitialContext.getURLOrDefaultInitCtx(InitialContext.java:344)
    at javax.naming.InitialContext.lookup(InitialContext.java:411)
    ... 7 more
            * * * * * * * * *
```

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A non-transitory computer readable storage medium, including computer-readable instructions stored thereon, which when read and executed by one or more computers, cause the one or more computers to perform a method comprising:
   providing, at a computing environment that enables software applications to be compiled and deployed to run within the computing environment, one or more service configurations,
   wherein each service configuration of the one or more service configurations defines a service usage to be found within source code of the software applications to be compiled and deployed, together with an associated action to be performed instead of the service usage;
   receiving a software application to be compiled and deployed to the computing environment, wherein the software application includes one or more service usages provided within a source code of the software application and associated with a service configuration;
   for each service usage found within the source code of the software application and associated with a service configuration:
   determining a matching service configuration for the service usage, and an associated action defined by the matching service configuration, to be performed instead of the service usage, and
   modifying the software application during compilation, according to the matching service configuration and associated action defined by the matching service configuration, to create an application runtime,
   including replacing code within the software application associated with the service usage, with a modified code for use within the computing environment; and
   packaging a handler, with the software application as modified, to enable the software application as modified to run within an application runtime within the computing environment and to use a corresponding service provided by the computing environment.

2. The non-transitory computer readable storage medium of claim 1, wherein the modified code is configured to, upon deployment of the software application to the computing environment, use the corresponding service provided by the computing environment.

3. The non-transitory computer readable storage medium of claim 2, wherein the modified code is configured to invoke the handler to use the corresponding service provided by the computing environment.

4. The non-transitory computer readable storage medium of claim 3, wherein at least one service configuration defines a service usage that is a method invocation, and wherein the modified code is configured to forward the method invocation to the handler, together with a context of the method invocation, for use by the handler in processing the method invocation.

5. The non-transitory computer readable storage medium of claim 3, wherein the computer-readable instructions further includes instructions to:
   provide access to one or more registered extensions that are adapted to be bound to the handler, to be used with the corresponding service provided by the computing environment.

6. The non-transitory computer readable storage medium of claim 5, wherein at least one service configuration defines a service usage that is a method invocation, and wherein a registered extension performs the method invocation with the corresponding service, on behalf of the software application.

7. The non-transitory computer readable storage medium of claim 1, wherein the computing environment is a cloud environment.

8. The non-transitory computer readable storage medium of claim 7, wherein the software application is a Java software application, and wherein the cloud environment includes a Java cloud service component that enables creation of Java service instances for use in provisioning and deployment of the Java software application.

9. The non-transitory computer readable storage medium of claim 7, the software application is deployed as an application runtime to the cloud environment, including binding one or more registered extensions to the software application to use a corresponding cloud service of the cloud environment.

10. The non-transitory computer readable storage medium of claim 1, wherein the computer-readable instructions further includes instructions to:
    receive a software application which includes a service usage that triggers e-mails from within the software application, and
    modify the software application during compilation, to replace one or more e-mail function calls, with calls to a corresponding e-mail service provided by the computing environment.

11. The non-transitory computer readable storage medium of claim 10, wherein the computer-readable instructions further includes instructions to:
    modify the software application during compilation and deployment, to replace one or more calls to a JavaMail API, with calls to at least one of a REST or other API provided by the computing environment.

12. The non-transitory computer readable storage medium of claim 10, wherein the computer-readable instructions further includes instructions to:
    associate one of a quota or limit with a user, to restrict an amount of e-mails that can be sent by that user using the corresponding e-mail service.

13. The non-transitory computer readable storage medium of claim 10, wherein the computer-readable instructions further includes instructions to:
    authenticate a user prior to allowing the user to send e-mail using the corresponding e-mail service, using an identity domain manager.

14. The non-transitory computer readable storage medium of claim 1, wherein the computer-readable instructions further includes instructions to:
    modify the software application to replace one or more function calls within the application to output application information, with calls to a corresponding service provided by the computing environment.

15. The non-transitory computer readable storage medium of claim 14, wherein the corresponding service provided by the computing environment is a logger that enables application-related output messages to be written to service logs.

16. The non-transitory computer readable storage medium of claim 1, wherein the computer-readable instructions further includes instructions to:
    modify the software application to handle name directory lookups differently, when the software application is used in different computing environments.

17. The non-transitory computer readable storage medium of claim 16, wherein the different computing environments includes a plurality of cloud environments, and wherein each particular cloud environment binds a particular resource component against a different lookup name for use with that cloud environment.

18. A system for automatic porting of software applications into a cloud computing or other environment, comprising:
    one or more computers, including one or more processors and a computing environment provided thereon that enables software applications to be compiled and deployed to run within the computing environment;
    a data defining one or more service configurations, wherein each service configuration of the one or more service configurations defines a service usage to be found within source code of the software applications to be compiled and deployed, together with an associated action to be performed instead of the service usage; and
    an application compiler, which upon receiving a software application to be compiled and deployed to the computing environment,
    wherein the software application includes one or more service usages provided within a source code of the software application and associated with a service configuration,
        for each service usage found within the source code of the software application and associated with a service configuration:
            determines a matching service configuration for the service usage, and an associated action defined by the matching service configuration, to be performed instead of the service usage, and
            modifies the software application during compilation, according to the matching service configuration and associated action defined by the matching service configuration,
        to create an application runtime, including replacing code within the software application associated with the service usage, with a modified code for use within the computing environment; and
    packages a handler, with the software application as modified, to enable the software application as modified to run within an application runtime within the computing environment and to use a corresponding service provided by the computing environment.

19. A method of automatic porting of software applications into a cloud computing or other environment, comprising:
    providing, at one or more computers including one or more processors,
    a computing environment that enables software applications to be compiled and deployed to run within the computing environment, and
    one or more service configurations, wherein each service configuration of the one or more service configurations defines a service usage to be found within source code of the software applications to be compiled and deployed, together with an associated action to be performed instead of the service usage;
    receiving a software application to be compiled and deployed to the computing environment,
    wherein the software application includes one or more service usages provided within a source code of the software application and associated with a service configuration;
    for each service usage found within the source code of the software application and associated with a service configuration:
    determining a matching service configuration for the service usage, and an associated action defined by the matching service configuration, to be performed instead of the service usage, and
    modifying the software application during compilation, according to the matching service configuration and associated action defined by the matching service configuration, to create an application runtime,
    including replacing code within the software application associated with the service usage, with a modified code for use within the computing environment; and
    packaging a handler, with the software application as modified, to enable the software application as modified to run within an application runtime within the computing environment and to use a corresponding service provided by the computing environment.

* * * * *

UNITED STATES PATENT AND TRADEMARK OFFICE
CERTIFICATE OF CORRECTION

PATENT NO. : 10,007,515 B2  
APPLICATION NO. : 15/200994  
DATED : June 26, 2018  
INVENTOR(S) : Subramanian et al.

Page 1 of 2

It is certified that error appears in the above-identified patent and that said Letters Patent is hereby corrected as shown below:

On the Title Page

Column 1, under Item (*) Notice, Line 3, after "0 days." delete "days.".

In the Specification

In Column 7, Line 44, delete "serv ice." and insert -- service. --, therefor.

In Column 9, Line 30, delete "kpsve._-fwd_-1" and insert -- kpsve._fwd_1 --, therefor.

In Column 9, Line 30, delete "R8w_-POLICY" and insert -- R8w_POLICY --, therefor.

In Column 9, Line 48, delete "Transport_-fwd_-1" and insert -- Transport_fwd_1 --, therefor.

In Column 9, Line 48, delete "Jkg_-R8w" and insert -- Jkg_R8w --, therefor.

In Column 11, Line 16, delete "_-findM" and insert -- _ findM --, therefor.

In Column 13, Line 64, delete "avaialble" and insert -- available --, therefor.

In Column 15, Line 14, delete "thorugh" and insert -- through --, therefor.

In Column 15, Line 33, delete "System.out.printIn( )" and insert -- System.out.println( ) --, therefor.

In Column 17, Line 24, delete "void_-deny_or_fwd_-6c7em" and insert -- void_deny_or_fwd_6c7em --, therefor.

In Column 17, Line 25, delete "_-E8b" and insert -- _E8b --, therefor.

In Column 17, Line 27, delete "(_-get" and insert -- (_get --, therefor.

Signed and Sealed this  
Second Day of April, 2019

Andrei Iancu  
*Director of the United States Patent and Trademark Office*

CERTIFICATE OF CORRECTION (continued)
U.S. Pat. No. 10,007,515 B2

In Column 17, Line 61, delete "_-find" and insert -- _find --, therefor.

In Column 19, Line 2, delete "_-find_" and insert -- _find_ --, therefor.

In Column 19, Line 3, delete "class));" and insert -- class}); --, therefor.

In Column 21, Line 26, delete "("jdni-name-sampe");" and insert -- ("jndi-name-sample"); --, therefor.

In Column 22, Line 24, delete ""jdni-name-sampe"" and insert -- "jndi-name-sample"; --, therefor.

In Column 22, Line 27, delete "_-deny_or_fwd_-CU" and insert -- _deny_or_fwd_CU --, therefor.

In Column 22, Line 28, delete "Rk704U_-P1j_" and insert -- Rk704U_P1j_ --, therefor.

In Column 22, Line 39, delete "_-deny_or_fwd_-CU" and insert -- _deny_or_fwd_CU --, therefor.

In Column 22, Line 39, delete "4U_-P1j_" and insert -- 4U_P1j_ --, therefor.

In Column 22, Line 42, delete "(_-get" and insert -- (_get --, therefor.

In Column 23, Line 11, delete "_-find" and insert -- _find --, therefor.

In Column 23, Line 24, delete "_-find" and insert -- _find --, therefor.

In Column 23, Line 25, delete "class));" and insert -- class}); --, therefor.

In Column 23, Line 51, delete "Q8nKp._-deny" and insert -- Q8nKp._deny --, therefor.

In Column 23, Line 52, delete "_-CU" and insert -- _CU --, therefor.

In Column 23, Line 52, delete "_-H5k" and insert -- _H5k --, therefor.